Patented Jan. 5, 1932

1,839,912

UNITED STATES PATENT OFFICE

HENRI LOUIS BARTHÉLEMY, OF VERCELLI, PIEMONT, ITALY, ASSIGNOR TO RUTH ALDO COMPANY, INC., OF NEW YORK, N. Y., A CORPORATION OF NEW YORK

PROCESS FOR THE ESTERIFICATION OF CELLULOSE

No Drawing. Application filed January 27, 1928, Serial No. 249,989, and in France December 30, 1927.

It is known that cellulose can be esterified by means of acetic anhydride in the presence of sulphuric acid; but it is also known that the employment of sulphuric acid presents the inconvenience of causing the formation of unstable cellulose sulphates which, to some extent, adversely affect the keeping properties of the cellulose acetates and of the products manufactured from them.

The process for the esterification of cellulose, forming the subject of the present invention, is characterized by the use of hydrofluoric acid (either in equeous solution or, preferably, dissolved in glacial acetic acid) as the principal catalyst, with or without a very small amount of an oxidizing agent such as nitric acid.

This catalyst effects a rapid acetylation of the cellulose at a low temperature, while furnishing remarkably viscous and at the same time limpid solutions of cellulose acetate in acetic acid, chloroform, acetone, or other of the usual solvents of cellulose acetate.

The procedure adopted for carrying out the invention may consist in one of the following:—

1. Introducing the cellulose into the complete acetylation bath composed of a mixture of acetic acid, acetic anhydride and the catalyst, in the presence, or absence, of a non-solvent such as benzol or carbon tetrachloride;

2. Introducing the cellulose into acetic acid in the first place, and then immersing the wet cellulose in the bath containing acetic anhydride and hydrofluoric acid, in the presence, or absence, of a non-solvent such as benzol;

3. First immersing the cellulose in the whole of the acetic acid and the catalyst, and then adding the acetic anhydride in one or more portions, in presence or absence of a non-solvent such as benzol;

4. Subjecting the cellulose to a preliminary treatment with a mixture of acetic acid and catalyst, in the presence of a small amount of acetic anhydride.

The mass is then treated with acetic anhydride, acetic acid, and a catalyst in successive portions, and each portion is not added until a state of approximate equilibrium has been established between the cellulose and the bath in which it is immersed.

5. Introducing the cellulose into the whole of the acetic acid and acetic anhydride.

The hydrofluoric acid catalyst, with or without addition of a small amount of nitric acid or other oxidizing agent, is added afterwards, either in successive portions or all at once.

The cellulose acetates prepared in this manner have the property of forming, when dissolved in known solvents, solutions which display remarkable optical properties owing to the destruction of the silica and the mineral compounds forming part of the ash constituents of the cellulose fibre. At the moment of precipitation by water, said silica passes into solution in a colloidal state, and is almost completely eliminated if particularly pure washing water be employed.

Other cellulose esters are obtained in the same way, by replacing the acetic anhydride by formic acid or monochloracetic anhydride.

*Example*

100 kg. of cotton are treated for 6 hours at 20° C. with 500 kg. of glacial acetic acid (99% strength) containing 12 kg. of hydrofluoric acid and 0.500 kg. of highly concentrated nitric acid. At the end of that period, 260 kg. of 93% acetic anhydride are added. By elevating the temperature the acetylation takes place in 7-15 hours. A clear, limpid and viscous sol is obtained, which can be precipitated with water or saponified according to known methods preferably using mineral acids, e. g. according to my Patent No. 1,668,482.

I claim:—

1. In the preparation of cellulose esters, the step of effecting esterification in the presence of hydrofluoric acid as a catalyst.

2. In the preparation of cellulose esters, the step of effecting esterification in the presence of hydrofluoric acid as a catalyst, said catalyst having associated therewith an oxidizing agent.

3. In the preparation of cellulose esters, the step of effecting esterification in the presence of hydrofluoric acid as a catalyst, said catalyst having associated therewith a small amount of nitric acid.

4. In the preparation of cellulose esters, the process of esterification consisting in first treating the cellulose with a mixture of acetic acid and hydrofluoric acid, and then adding acetic anhydride.

5. In the preparation of cellulose esters, effecting esterification in the presence of hydrofluoric acid as a catalyst, said catalyst having associated therewith acetic acid and acetic anhydride.

In testimony whereof I affix my signature.

HENRI LOUIS BARTHÉLEMY.